No. 732,478. PATENTED JUNE 30, 1903.
T. WESTERMAN.
MACHINE FOR RUBBING FLOUR AND LARD.
APPLICATION FILED MAY 5, 1902.
NO MODEL. 3 SHEETS—SHEET 3.
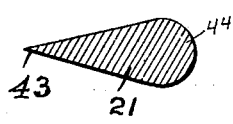
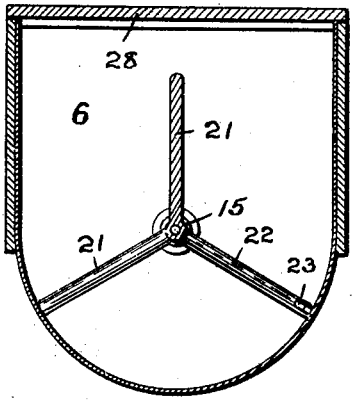
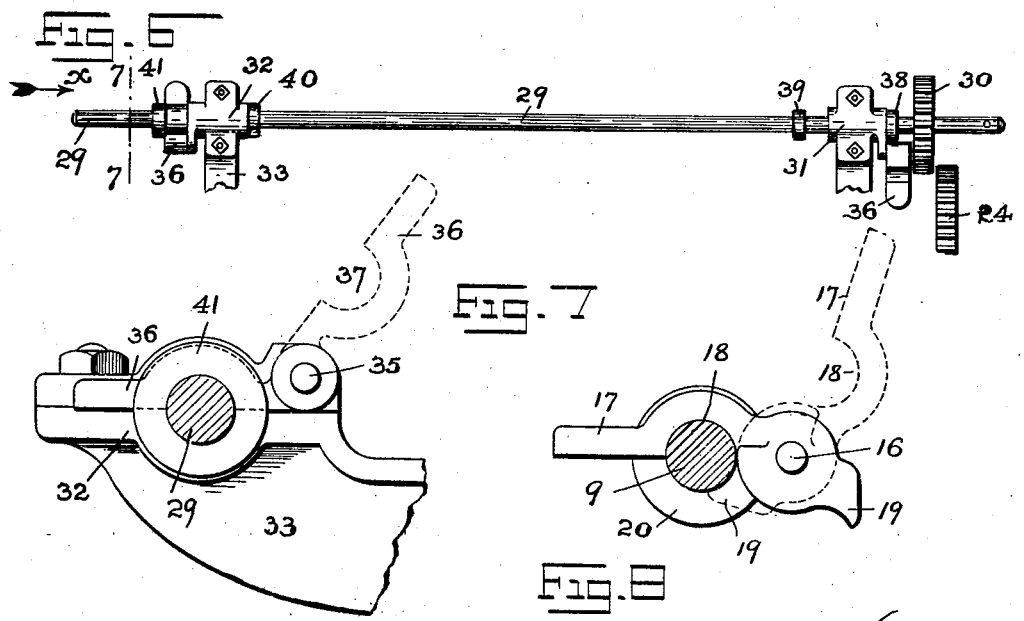
WITNESSES:
Geo. D. Richards
Susan Blewett
INVENTOR:
Theodore Westerman
BY
Fred C. Fraentzel,
ATTORNEY No. 732,478. Patented June 30, 1903.

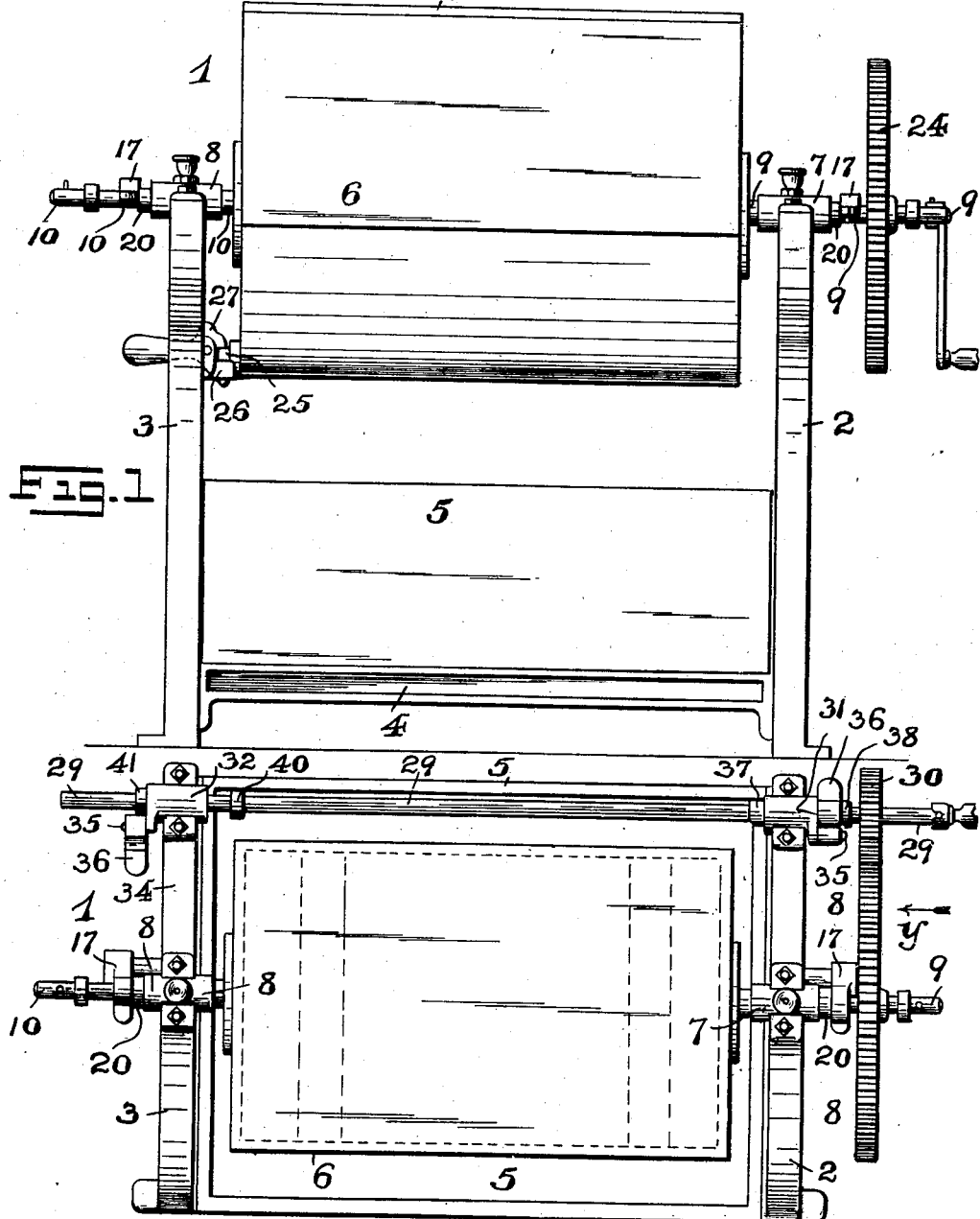

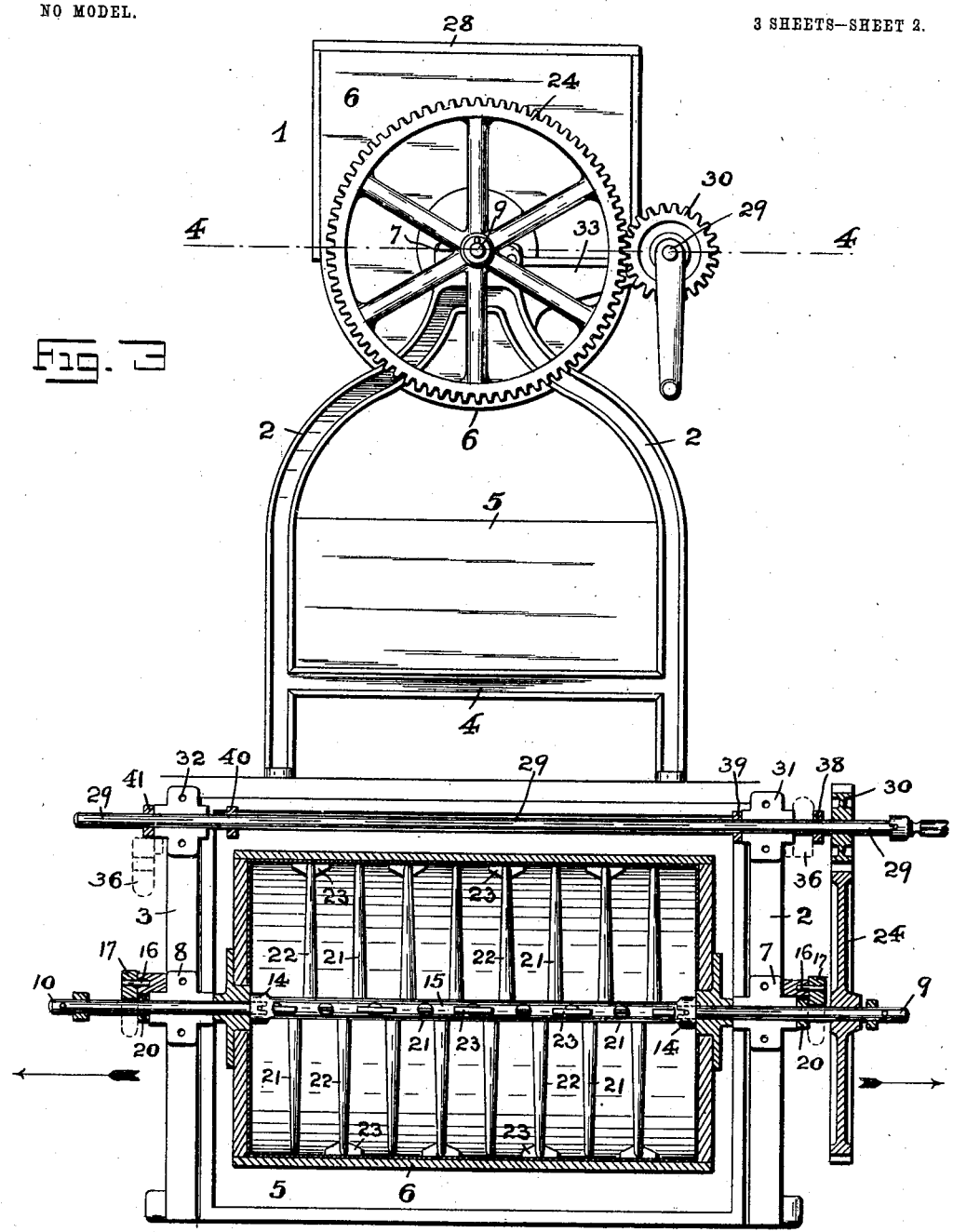

UNITED STATES PATENT OFFICE.

THEODORE WESTERMAN, OF NEWARK, NEW JERSEY.

MACHINE FOR RUBBING FLOUR AND LARD.

SPECIFICATION forming part of Letters Patent No. 732,478, dated June 30, 1903.

Application filed May 5, 1902. Serial No. 105,934. (No model.)

*To all whom it may concern:*

Be it known that I, THEODORE WESTERMAN, a citizen of the United States, residing at Newark, in the county of Essex and State of New Jersey, have invented certain new and useful Improvements in Machines for Rubbing Flour and Lard; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates more particularly to a novel construction of pastry-mixing and dough-rubbing machine or apparatus, with a view of providing a simple and cheaply-constructed as well as an efficient mechanism for thoroughly mixing and rubbing the flour and lard and in a very short time producing a light pastry-dough.

Other objects of this invention are to provide a mechanism which can be readily manipulated to produce a pastry-dough in a very short time and to provide in connection with the mixing and rubbing receptacle a set of combined knives and scrapers which revolve within said receptacle to thoroughly cut and mix and rub the dough and at the same time to prevent the sticking or adhering of the flour and dough to the inner surfaces of the mixing-receptacle.

With the various objects in view the present invention consists in the novel pastry mixer and rubber hereinafter set forth; and, furthermore, this invention consists in the various novel arrangements and combinations of parts, as well as in the details of the construction thereof, all of which will be fully described in the accompanying specification and then finally embodied in the clauses of the claim.

The invention is clearly illustrated in the accompanying drawings, in which—

Figure 1 is a front elevation, and Fig. 2 a plan or top view, of a pastry mixer and rubber embodying the principles of my present invention. Fig. 3 is an end view of the apparatus, and Fig. 4 is a horizontal section taken on line 4 4 of said Fig. 3. Fig. 5 is a vertical cross-section of the mixing and rubbing receptacle and cover and the revolving mixing and rubbing and scraping device within said receptacle. Fig. 6 is a detail view of an auxiliary shaft and pinion and a pair of bearings in which said shaft is operatively arranged and is capable of a laterally-sliding motion in said bearings, the said view representing in connection with said bearings a pair of locking or holding devices for retaining said shaft in different laterally-adjusted relation to the main gear on the main spindle or shaft bearing the cutters and scrapers. Fig. 7 is a detail vertical cross-section taken on line 7 7 in said Fig. 6 looking in the direction of the arrow X, representing in side elevation one of the holding or locking devices in its closed or holding relation with the auxiliary shaft represented in said Fig. 6; and Fig. 8 is a detail vertical cross-section taken on line 8 8 in Fig. 2 looking in the direction of arrow Y, illustrating one of a pair of holding or locking devices employed with the separable end members of the main spindle provided with the cutter or scraper arms of the apparatus. Fig. 9 is a detail view of the disconnected ends of the said main spindle and one of the said separable end members. Fig. 10 is a horizontal section of a portion of the said mixing and rubbing receptacle, a part of the frame of the apparatus, and a top view of a holding or locking catch for retaining said receptacle in an immovable position while preparing the pastry-dough, but permitting of the turning of said receptacle when the pastry-dough has been made to turn said dough into a receiving-box for future use. Figs. 11 and 12 are sectional representations of variously-formed cutters or knives that may be used with the mixing apparatus.

Similar characters of reference are employed in all of the said above-described views to indicate corresponding parts.

In the said drawings the reference character 1 indicates the complete mixing and rubbing machine or apparatus, the same comprising suitable frame-pieces or standards 2 and 3 and a lower connecting-piece or shelf 4, upon which may be removably placed a receiving-box 5, into which the finished pastry mixture is deposited from a mixing and rubbing receptacle 6 of the machine for its use in the baking of pies and other pastry.

The frame-piece or standard 2 is provided with a suitable bearing 7, and the frame-piece or standard 3 has a bearing 8. Suitably arranged within the bearing 7 is a spindle or shaft member 9, and within the bearing 8 is a similar spindle or shaft member 10, the said members 9 and 10 having their inner end portions extending through the sides of the mixing and rubbing receptacle 6. Each end of the members 9 and 10 is provided with a slot or cut 11, as indicated more particularly in Fig. 9 of the drawings, which is fitted over a pin 13, extending laterally across a receiving-socket 14 at each end of the main shaft or spindle 15. In this manner the said shaft or spindle 15 is operatively connected with the ends of the spindle or shaft members 9 and 10. To prevent the disconnection of these various parts while the machine is in operation or to disconnect said parts when it is desired to remove the said main shaft or spindle 15 and its knives or scrapers from the receptacle 6 for the purpose of cleaning the same, I have provided each bearing 7 and 8 with a laterally-extending pin or pivot 16, on which I have pivoted a latch or holding-dog 17, which has a projection 19 for holding the latch in its raised position, as indicated in dotted outline in Fig. 8, and also has a curved depression 18, fitting over a portion of the shaft or spindle members, as illustrated. The said shaft or spindle members 9 and 10 are provided with collars or nuts 20, against the outer surface of which the said latches or dogs 17 can be turned to prevent any lateral displacement of the said connected spindle 15 and 9 and 10. When the said latches or dogs are thrown back, then the said shaft or spindle members 9 and 10 can be withdrawn in the opposite directions (indicated by the arrows in said Fig. 4) to disconnect the main spindle 15 and permit of its removal from the receptacle 6. The said main spindle 15 is made with a series of radially-arranged and alternately-spaced knives or cutters 21 and 22, the said knives or cutters 22 being made at their ends with oppositely-extending wings or projections 23, which are in close proximity to the inner curved surface of the mixing and rubbing receptacle 6 and during the operation of mixing and rubbing keep the inner surface of said receptacle clear from the flour and the dough that might otherwise adhere thereto. To actuate the said knives and scrapers, one of the said shaft or spindle members, as 9, is provided with a suitable driving-wheel 24, preferably a gear-wheel, as here shown.

To retain the mixing and rubbing receptacle 6 in a fixed and immovable position during the mixing and rubbing operation, the said mixing and rubbing receptacle is provided at one side with a projection 25, which is held against movement between a bearing-plate 26, extending from the side of one of the standards, as 3, and a pivoted lever 27, as clearly illustrated in Figs. 1 and 10, the said lever being capable of a pivotal movement by hand to permit of a partial rotation of the receptacle 6 upon said spindle 15 to deposit the pastry-dough into the receiving-box 5.

When the machine is to be used for mixing and rubbing a pastry-dough to produce a flaked pie-crust when baked, the receptacle 6 is retained in its immovable or fixed position by means of the said lever 27, and the cover 28 of said receptacle is removed. A mixture of flour and lard in the proper proportions is placed within said receptacle 6 and the cover 28 replaced. The connected spindle 15 and spindle members 9 and 10 are then set in rapid motion for a short time to cause the said arms or knives 21 and 22 to break up and to rub together the flour and lard into a combined flour-like mass, the scrapers 23 keeping the inner surface of the receptacle 6 from adherence thereto of the flour and lard. After this has been accomplished a sufficient quantity of water is added and the spindle 15 and its knives and scrapers then rotated slowly until a pastry-dough of the proper consistency is produced. In order that a slow motion of the said spindle 15 and its parts may be produced, I provide an auxiliary shaft 29 and a pinion 30, which can be thrown into and out of gear with the driving gear-wheel 24, hereinabove mentioned, the said auxiliary shaft in that case being used as the driving-shaft. The said shaft 29 is rotatively arranged in the bearings 31 and 32, respectively, connected, by means of brackets 33 and 34 or in any other suitable manner, with the standards 2 and 3. Each bearing 31 and 32 is provided at its side with an oppositely-extending pivot 35, on which is pivoted a holding-latch 36, having a curved depression 37, adapted to be arranged upon a portion of the shaft 29. As illustrated in Figs. 4 and 6, the said shaft is provided near its one end on opposite sides of the bearing 31 with collars or nuts 38 and 39 and upon its other end on opposite sides of the bearing 32 with collars 40 and 41, whereby when both of the said latches 36 are thrown back the said shaft has a limited lateral motion in said bearings 31 and 32 sufficient to disengage said pinion 30 from the gear 24 or to cause its operative mesh with said gear. When the auxiliary shaft 24 is in the position indicated in said Fig. 4 and the latch at the right has been placed in the space between the bearing 31 and the collar or nut 38, then the pinion 30 is in operative mesh with the gear 24, and by applying the driving power directly to the auxiliary shaft 29 the said spindle 15 and its parts are caused to revolve more slowly. The disengaged positions of the shaft 29 and of the pinion 30 and gear 24 are represented in Fig. 6 of the drawings and will be clearly understood from an inspection of said Fig. 6 and need, therefore, not be more particularly described. After the slow motions of the spindle 15 and its knives and scrapers have been produced for a time then the mixture of flour, lard, and water is of such consistency that the operations of the movable parts of the machine can be stopped, and by removing the cover from the receptacle 6 and partly turning said receptacle 6 in the manner previously stated the finished pastry-dough can be delivered into the receiver or box 5 for its use in baking pies and the like. As illustrated more particularly in Figs. 11 and 12, the said agitating knives or cutters are preferably made with the sharp edges 42 or 43, whereby the mixture of flour and lard or the dough formed is constantly cut up or sliced while being agitated and with the widened backs 44, (see Fig. 12,) all the cutters being arranged in such a manner that all their cutting edges extend in the same directions, thereby when the cutters are rotated constantly forcing the cut or sliced dough into the narrower spaces between the widened backs of the knives and by producing a thorough and suitable compressive action upon the dough by means of the said widened backs rubbing the dough as required to produce a flaky and light pastry.

I am aware that changes may be made in the various arrangements and combinations of the parts without departing from the scope of my present invention. Hence I do not limit my invention to the exact arrangements and combinations of the various devices and their parts as described in the present specification and as illustrated in the accompanying drawings, nor do I confine myself to the exact details of the construction of the said parts.

Having thus described my invention, what I claim is—

1. In a machine for rubbing flour and lard, the combination, with the machine-frame and its bearings, of a horizontal spindle arranged in said bearings, and means for actuating said spindle, a rubbing-receptacle, adapted to receive flour and lard, and a series of rubbing-knives extending at right angles from said spindle, and rotating in vertical planes, said portion of the spindle which carries said knives being detachably connected with the remaining portions of said spindle in said bearings and being removable from said rubbing-receptacle, and said knives rotating in one direction and having sharp cutting edges and widened backs, constructed to cut through the lard and rub the same with the flour and lard into a flour-like mass, substantially as and for the purposes set forth.

2. In a machine for rubbing flour and lard, the combination, with the machine-frame and its bearings, of a horizontal spindle rotatably arranged in said bearings, and means for actuating said spindle, a rubbing-receptacle, adapted to receive flour and lard, and a series of rubbing-knives extending at right angles from said spindle and rotating in vertical planes, said portion of the spindle which carries said knives being detachably connected with the remaining portions of said spindle in said bearings and being removable from said rubbing-receptacle, and said knives rotating in one direction and having sharp cutting edges and widened backs, constructed to cut through the lard and rub the same with the flour and lard into a flour-like mass, substantially as and for the purposes set forth.

In testimony that I claim the invention set forth above I have hereunto set my hand this 30th day of April, A. D. 1902.

THEODORE WESTERMAN.

Witnesses:
  JOHN G. TRUSDELL,
  GEO. D. RICHARDS.